United States Patent [19]
Hayashida et al.

[11] Patent Number: 5,100,747
[45] Date of Patent: Mar. 31, 1992

[54] DRY METHOD FOR MANUFACTURING HYDROGEN ABSORPTION ALLOY ELECTRODE

[75] Inventors: Hirotaka Hayashida; Yuji Sato; Ken-ichi Kanno; Motoya Kanda, all of Yokohama, Japan

[73] Assignee: Kabushiki Kaisha Toshiba, Kawasaki, Japan

[21] Appl. No.: 662,506

[22] Filed: Feb. 28, 1991

Related U.S. Application Data

[63] Continuation of Ser. No. 405,978, Sep. 12, 1989, abandoned.

Foreign Application Priority Data

Sep. 13, 1988 [JP] Japan .................. 63-229393

[51] Int. Cl.$^5$ ............... H01M 4/62; H01M 4/04
[52] U.S. Cl. ................... 429/101; 429/217; 29/623.5
[58] Field of Search ........... 429/101, 217; 29/623.5

[56] References Cited

U.S. PATENT DOCUMENTS

| | | |
|---|---|---|
| 4,337,140 | 6/1982 | Solomon . |
| 4,396,693 | 8/1983 | Bernstein et al. ............ 429/217 |
| 4,636,445 | 1/1987 | Yamano et al. ............ 429/101 X |
| 4,849,312 | 7/1989 | Mitsuyasu et al. ............ 429/217 |

FOREIGN PATENT DOCUMENTS

| | | |
|---|---|---|
| 043632 | 1/1982 | European Pat. Off. . |
| 144002 | 6/1985 | European Pat. Off. . |
| 266162 | 5/1988 | European Pat. Off. . |
| 277332 | 10/1988 | European Pat. Off. . |
| 2450121 | 1/1980 | France . |
| 53-118737 | 10/1978 | Japan . |
| 54-13938 | 2/1979 | Japan . |
| 61-066372 | 4/1986 | Japan . |
| 61-66372 | 4/1986 | Japan . |
| 61-124054 | 6/1986 | Japan . |

OTHER PUBLICATIONS

Patent Abstracts of Japan, vol. 10, No. 168, (E-411) [2224], 14th Jun. 1986; & JP-A-61 19 063 (Sanyo Denki K.K.) 27-01-1986.

*Primary Examiner*—Stephen Kalafut
*Attorney, Agent, or Firm*—Oblon, Spivak, McClelland, Maier & Neustadt

[57] ABSTRACT

A hydrogen absorption alloy electrode is manufactured by a dry method in which a fluorine resin powder in an amount of 0.5 to 5.0%, based on the weight of the electrode, is with a hydrogen absorption alloy powder while applying a sufficient shearing force such that the fluorine resin powder is turned into an aggregate of monofilaments each having a diameter D of about 5 to 100 microns, a length L of about 100 to 500 microns, and an aspect ratio L/D of 10 to 100, so as to prepare a cotton-like mixture. The cotton-like mixture is placed on a conductive substrate acting as a current collector, and shaped by a roll pressing.

14 Claims, 5 Drawing Sheets

DRY METHOD FOR MANUFACTURING HYDROGEN ABSORPTION ALLOY ELECTRODE

This application is a continuation of application Ser. No. 07/405,978 filed on Sept. 12, 1989 now abandoned.

BACKGROUND OF THE INVENTION

1. Field of the Invention

The present invention relates, broadly, to a nickel oxide-hydrogen secondary cell, and more particularly, to a method of manufacturing a hydrogen absorption alloy electrode containing a hydrogen absorption alloy as the main component of the negative electrode.

2. Description of the Related Art

It is known to the art that a so-called "hydrogen absorption alloy", i.e., an alloy capable of reversibly absorbing and desorbing hydrogen, acts not only on a gaseous hydrogen but also on the ionic hydrogen such as proton or hydronium ion so as to electrochemically absorb hydrogen atoms. The negative electrode of a secondary cell using such a hydrogen absorption alloy does not contain a harmful metal. In addition, the hydrogen absorption alloy is light in weight, compared with cadmium used in a nickel-cadmium secondary cell for forming the negative electrode or lead used in a lead secondary cell for forming the negative electrode, with the result that the hydrogen absorption alloy leads to a high energy density per unit weight. It follows that it is possible to prepare a secondary cell having a high energy density, if a negative electrode using a hydrogen absorption alloy is used in combination with a positive electrode formed of a nickel compounds including $Ni(OH)_2$ and $NiOOH$.

In a nickel oxide-hydrogen secondary cell having a positive electrode formed of nickel oxide and a negative electrode containing a hydrogen absorption alloy as a main component, reaction 1 given below takes place at the negative electrode. On the other hand, reaction 2 given below takes place at the positive electrode:

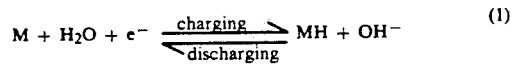
(1)

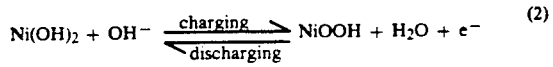
(2)

"M" in formula (1) represents a hydrogen absorption alloy.

Several methods are known to the art with respect to the manufacture of a negative electrode for a secondary cell using a hydrogen absorption alloy, including, for example, a method in which a powdery hydrogen absorption alloy is shaped by using a suitable binder, a method in which a powdery hydrogen absorption alloy is sintered under an inert gas atmosphere, a hydrogen gas atmosphere or under vacuum, and a method in which a hydrogen absorption alloy is amorphitized. Among these known methods, the method involving the sintering treatment and the amorphiti for making the hydrogen absorption alloy amorphous require complicated techniques and are poor in shaping capability, making it practically difficult to incorporate the electrode formed by these methods in a cell to manufacture a satisfactory cell.

Under the circumstances, the method in which a powdery hydrogen absorption alloy is shaped by using a suitable binder is employed in general for the manufacture of the electrode. In this method, a fluorine resin binder is used most widely in the light of the bonding strength and workability.

A method of manufacturing a hydrogen absorption alloy electrode using a fluorine resin binder is disclosed in, for example, Published Unexamined Japanese Patent Application No. 61-66372, Published Unexamined Japanese Patent Application No. 61-124054 and U.S. Pat. No. 4,636,445. In the method disclosed in these prior arts, a thickening agent such as carboxymethyl cellulose (CMC) or polyvinyl alcohol (PVA) is added together with water to a mixture of the powdery hydrogen absorption alloy and the binder so as to uniformly knead the mixture, followed by coating, drying and rolling the kneaded mass so as to obtain a desired electrode. In this method, however, the hydrogen absorption alloy is oxidized by the water added in the kneading step or by the heat applied in the drying step, giving rise to serious problems. For example, the negative electrode capacity is lowered, and the negative electrode is lowered in its capability of reducing oxygen gas generated at the positive electrode during the over-charging operation, leading to a shortened life of the cell. It is also known to the art that a powdery hydrogen absorption alloy is uniformly mixed with a powdery binder, followed by forming an electrode by means of pressing. In this method, however, the electrode surface is excessively covered with the binder, leading to a low electrode capacity.

As described above, the hydrogen absorption alloy electrode manufactured in any of the conventional methods using a binder is low in a capability of reducing oxygen gas generated at the positive electrode during over-charging, or in an electrode capacity.

SUMMARY OF THE INVENTION

An object of the present invention is to provide a method of manufacturing a hydrogen absorption alloy electrode which exhibits a high reduction capability of an oxygen gas and which has a high electrode capacity.

According to the present invention, there is provided a dry method for the manufacture of a hydrogen absorption alloy electrode, which comprises the steps of mixing a fluorine resin powder in an amount of 0.5 to 5.0% based on the weight of the electrode with a hydrogen absorption alloy powder while applying a sufficient shearing force so as to provide a cotton-like mixture; and placing the cotton-like mixture on a conductive substrate acting as a current collector so as to shape the mixture.

DETAILED DESCRIPTION OF THE PREFERRED EMBODIMENT

Figure 1:
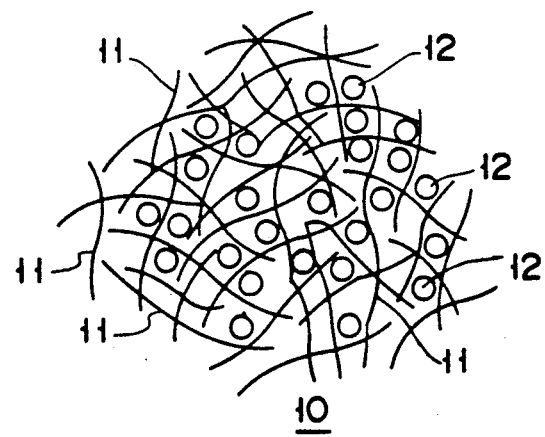
FIG. 1 schematically shows a cotton-like mixture prepared by mixing a hydrogen absorption alloy powder and a fluorine resin powder while applying a shearing stress according to the present invention.

In the dry method for the manufacture of a hydrogen absorption alloy electrode of the present invention, a hydrogen absorption alloy powder is mixed with a predetermined amount of fluorine resin powder, while applying a shearing force to the mixture, by a mixer such as a cutter mill. As a result, the fluorine resin is turned into a cotton-like aggregate structure of monofilaments in which slender monofilaments ar entangled with each other. The hydrogen absorption alloy powder particles are held within the free space formed within the aggregate structure. The slender monofilaments of the resin are entangled with each other to form a cotton-like structure such that the powder particles of the hydrogen absorption alloy are not dropped from within the free spaces formed in the cotton-like structure. The monofilament has a diameter D of about 5 to 100 μm, a length L of about 100 to 500 μm, and an aspect ratio L/D of is 10 to 100. It is necessary to carry out the mixing until the fluorine resin binder is turned into monofilaments of this degree in order to obtain a satisfactory electrode. In other words, it is necessary to apply a sufficient shearing force in the step of mixing the hydrogen absorption alloy power and the fluorine resin powder such that the fluorine resin powder is turned into an aggregate structure of such monofilaments. As a result of such a mixing step, a cotton-like mixture is obtained which is formed of an aggregate structure of fibrous fluorine resin and the hydrogen absorption alloy powder held within and bonded strongly to the fluorine resin fibers. FIG. 1 schematically shows a cotton-like mixture 10. It is seen that a hydrogen absorption alloy powder particles 12 are held within a cotton-like aggregate structure of fluorine resin monofilaments 11 which are entangled in a three dimensional direction.

The fluorine resin used in the present invention as a binder includes organic high molecular weight compounds having the hydrogen atoms replaced at least partly by fluorine atoms and a mixture of such compounds. For example, such a fluorine resin includes polytetrafluoroethylene (PTFE), tetrafluoroethylenehexafluoropropylene copolymer (FEP), ethylenetetrafluoroethylene copolymer and polytetrafluoroethylene.

In the present invention, the fluorine resin powder is used in an amount of 0.5 to 5.0% based on the weight of the electrode. If the amount of the fluorine resin powder is smaller than 0.5%, the hydrogen absorption alloy powder fails to be bonded sufficiently to the fluorine resin, making it difficult to shape the mixture as desired. On the other hand, if the amount of the fluorine resin powder is larger than 5.0%, the alloy powder particles are excessively covered with the binder, i.e., the fluorine resin at the surface of the electrode. As a result, the electrode capacity is lowered. In addition, it is impossible for the cell to perform charging and discharging of large current. Incidentally, the weight of the electrode used herein with reference to the amount of the fluorine resin denotes the sum of the weight of the hydrogen absorption alloy powder which is the main component of the electrode and the weight of the fluorine resin acting as the binder in the manufactured electrode.

The hydrogen absorption alloy used in the present invention includes, for example, $LaNi_5$, $MmNi_5$ ("Mm" representing a Misch metal), $LmNi_5$ ("Lm" representing a Misch metal rich in lanthanum), and alloys of these $MmNi_5$ and $LmNi_5$ having Ni partly replaced by other metals such as Al, Mn, Fe, Co, Ti, Cu, Zn, Zr, and Cr. It is also possible to use alloys of $Mg_2Ni$ system, TiNi system and TiFe system. Further, it is possible to use any alloy, which is capable of easily absorbing hydrogen electrochemically generated within the electrolyte during the charging operation and which is easily capable of desorbing the absorbed hydrogen during the discharging operation. The hydrogen absorption alloy powder particles generally have a particle diameter of 100 μm or less.

The cotton-like mixture, which is obtained by mixing the hydrogen absorption alloy powder and the fluorine resin powder while applying a shearing stress force thereto as described above, is placed on a conductive substrate acting as a current collector. Under this condition, the cotton-like mixture is shaped by roll pressing so as to obtain a desired electrode. The roll pressing can be suitably carried out under a pressure of 0.5 ton/cm to 5 ton/cm. The use of a predetermined amount of a fluorine resin binder, the formation of the fluorine resin into a fibrous structure, and the roll pressing treatment described above enable 5 to 60% of the surface area of the resultant hydrogen absorption alloy electrode to be covered with the fibrous fluorine resin binder. As a result, the electrode is enabled to perform satisfactory functions. If more than 60% of the electrode surface area is covered with the binder, the exposed amount of the hydrogen absorption alloy is too small to perform a satisfactory electrode reaction.

Figure 2:
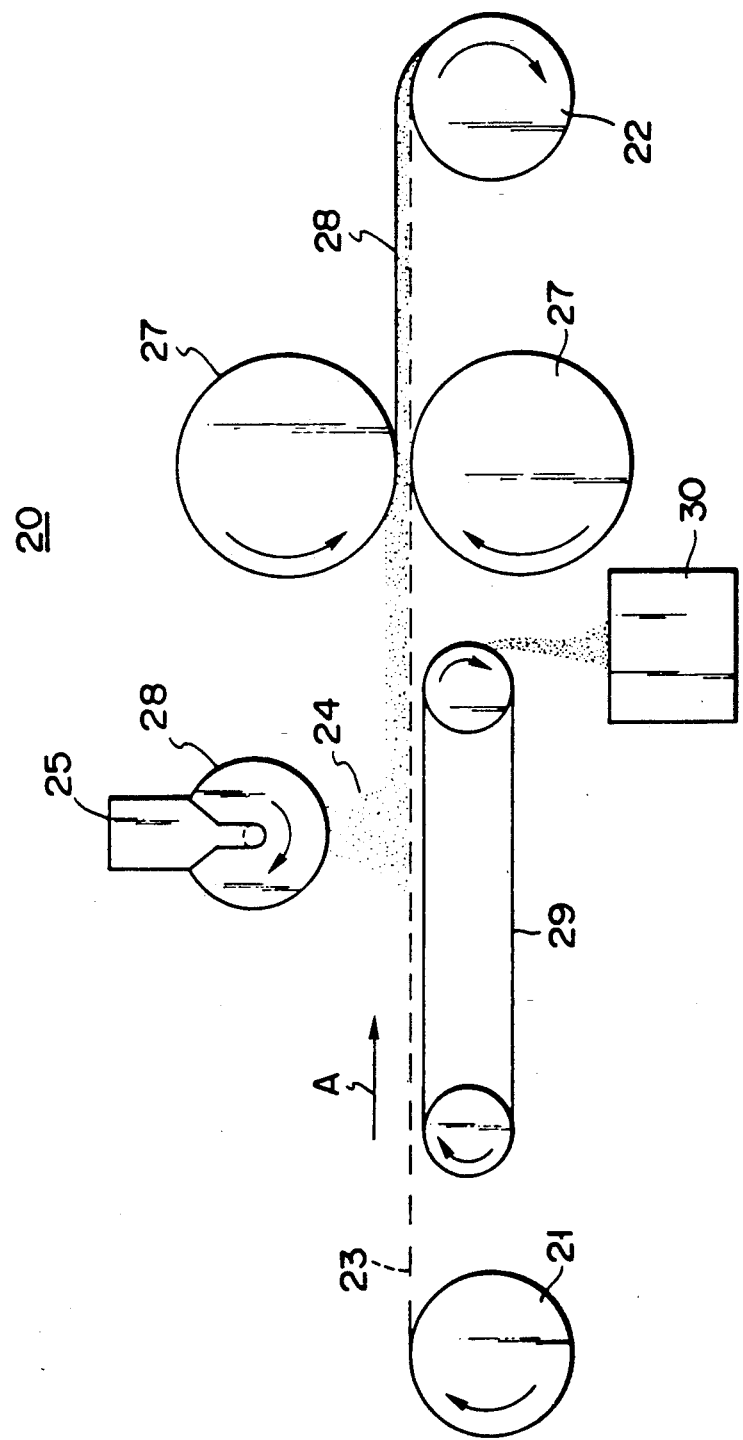
FIG. 2 schematically shows an example of an apparatus suitably used for the manufacture of a hydrogen absorption alloy electrode of the present invention.

FIG. 2 shows a manufacturing apparatus 20 of a dry sheet-like electrode, which is suitably used for the manufacture of a hydrogen absorption alloy electrode of the present invention. As seen from the figure, the apparatus 20 comprises a current collector feeder 21 and an electrode take-up device 22 disposed apart from the feeder 21. A mesh-like current collector 23, which is supplied from the feeder 21, is moved at a predetermined speed in the direction denoted by an arrow A. Disposed above the current collector 23 is a constant supply device 25 serving to supply quantitatively a cotton-like mixture 24 prepared as described previously, which contains a hydrogen absorption alloy powder and a fluorine resin binder. It is possible to use, for example, a screw feeder or a micro feeder as the constant supply device 25. The cotton-like mixture 24 supplied from the constant supply device 25 is sprinkled by a powder supply device 26 onto the moving current collector 23. The current collector 23 having the mixture 24 sprinkled thereon is continuously shaped by a pair of press rollers 27 into a sheet-like electrode 28 of a predetermined thickness and, then, taken up by the electrode take-up device 22.

Disposed below the current collector 23 is a belt conveyor device 29 serving to recover the cotton-like mixture 24 dropping from the current collector 23 when the mixture 24 is sprinkled onto the current collector 23. The cotton-like mixture 24 thus recovered is housed in a housing vessel 30.

Figure 3:
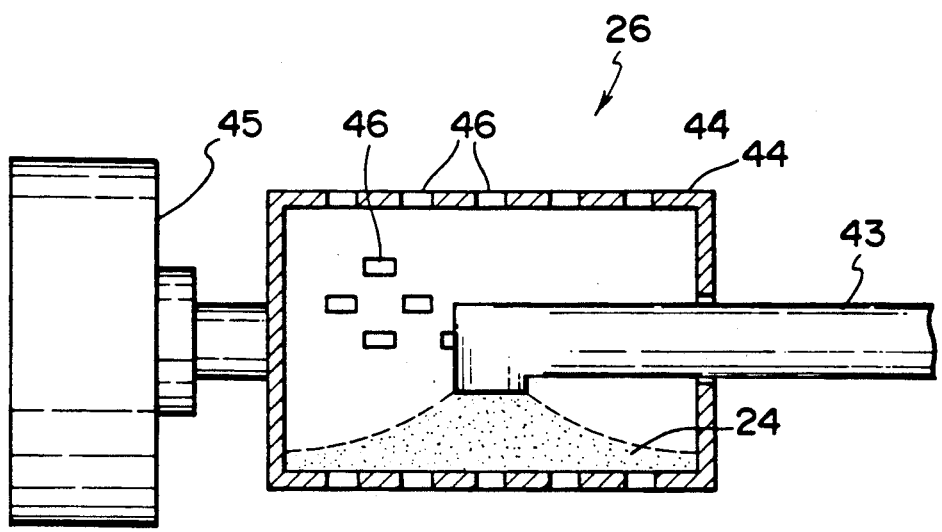
FIGS. 3 to 5 schematically show different modifications of the powder supply device used in the apparatus shown in FIG. 2.

FIG. 3 shows in detail the construction of the powder supply device 26 included in the apparatus 20 shown in FIG. 2. As seen from the figure, the powder supply device 26 comprises a cylindrical housing vessel 44 serving to house the cotton-like mixture 24 supplied from the constant supply device 25 through a nozzle 43 and a driving device 45 serving to rotate the housing vessel 44 about its axis. During the rotation of the housing vessel 44, the cotton-like mixture 24 housed in the housing vessel 44 is continuously discharged to the outside through a plurality of holes 46 formed at the circumferential surface of the housing vessel 44.

Figure 4B:
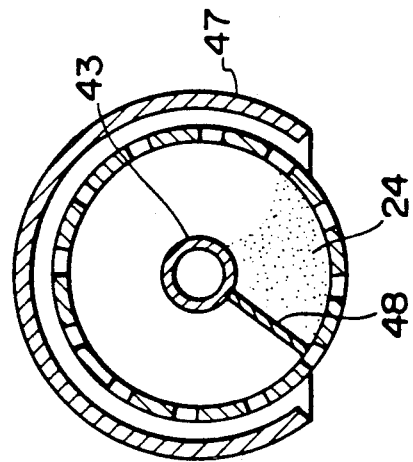
Figure 4A:
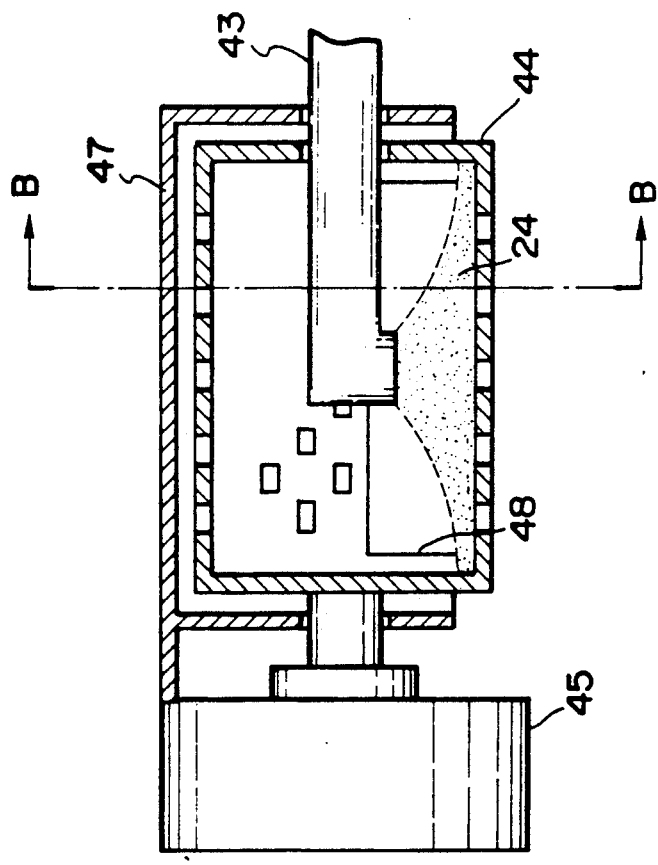

As shown in FIGS. 4A and 4B, a shutter 47 and a scriber 48 can be included in the powder supply device 26 so as to achieve a uniform sprinkling of the cotton-like mixture 24 effectively. To be more specific, the shutter 47 is fixed to the driving device 45 in a manner to surround the housing vessel 44 and has a cut-off portion. On the other hand, the scriber 48 is formed of rubber and is mounted to the nozzle 43 serving to supply the cotton-like mixture 24 from the constant supply device. Incidentally, the reference numerals common with FIGS. 4A, 4B and FIG. 3 denote the same members of the apparatus.

Figure 5:
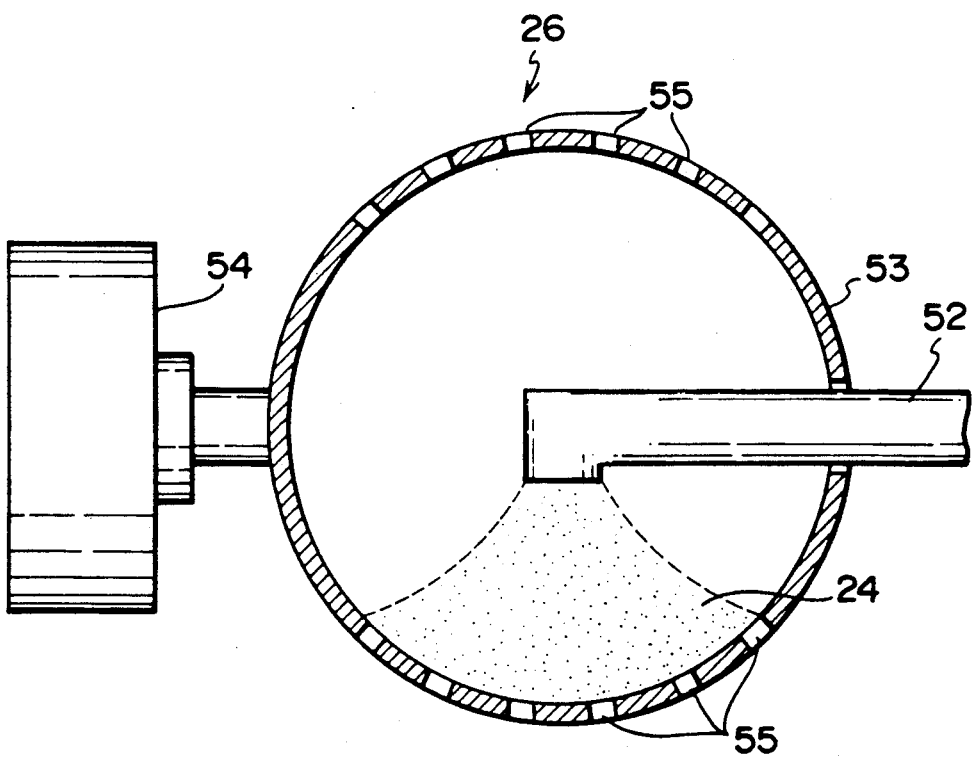

FIG. 5 shows a modification of the powder supply device shown in FIG. 2. The powder supply device 26 shown in FIG. 5 comprises a hollow spherical housing vessel 53 serving to house the cotton-like mixture 24 supplied from the constant supply device 25 through a nozzle 52 and a driving device 54 serving to rotate the housing vessel 53 about its axis. A large number of holes 55 are formed at a predetermined region of the circumferential surface of the housing vessel 53 so as to permit a continuous discharge of the cotton-like mixture 24 from within the housing vessel 53 during rotation of the vessel 53. The manufacturing apparatus comprising the powder supply device 26 of the construction described above makes it possible to obtain a dry sheet-like electrode having the cotton-like mixture sprinkled uniformly on the current collector.

Figure 6:
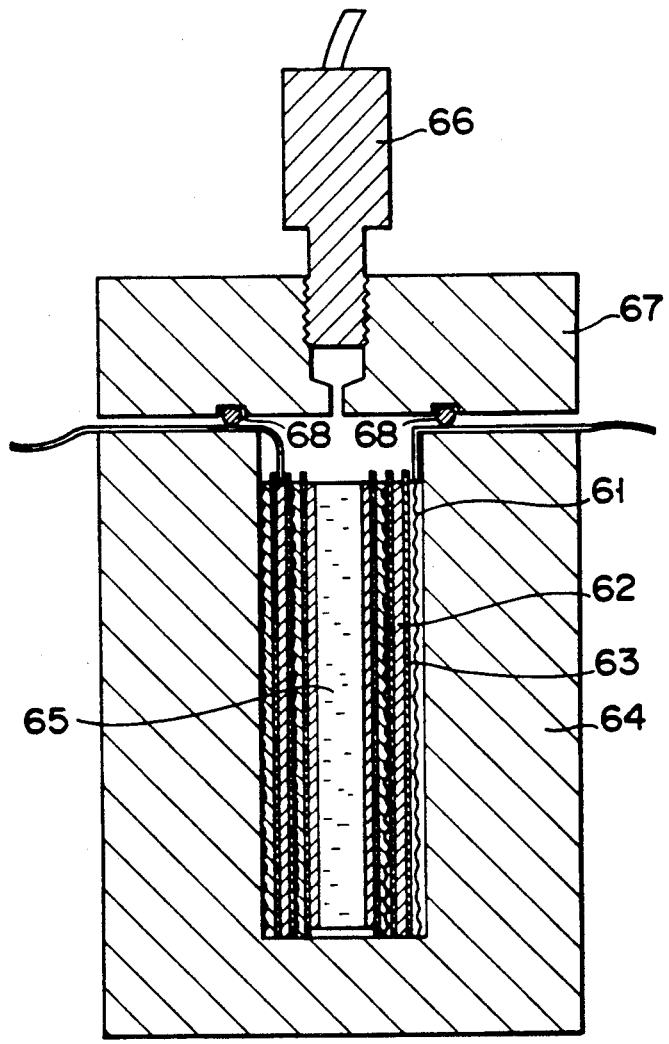
FIG. 6 schematically shows a hydrogen cell model.

FIG. 6 shows a model of a nickel oxide-hydrogen secondary cell of Unit-Three size having a hydrogen absorption alloy electrode of the present invention incorporated therein as the negative electrode. As seen from the figure, a negative electrode 61 formed of a sheet-like hydrogen absorption alloy of the present invention and a positive electrode 62 formed of nickel oxide are tightly wound spirally in a cylindrical form, with an insulating separator 63 consisting of, for example, a polyamide nonwoven fabric interposed therebetween. The cylindrical electrode assembly consisting of the negative electrode 61, the positive electrode 62 and the separator 63 is housed in a cylindrical container 64 having a bottom wall. Housed in the cylindrical container 64 is an electrolyte 65 consisting of an aqueous solution dissolving an alkali material such as potassium hydroxide. Further, a lid 67 having a pressure sensor 66 mounted thereto is fixed to the container 64 with packings 68 interposed therebetween.

EXAMPLE

A hydrogen absorption alloy electrode was manufactured by the method of the present invention. In the first step, a cotton-like mixture was prepared by mixing a fine powder of $LmNi_{4.2}Mn_{0.3}Al_{0.3}Co_{0.2}$ sized 20 meshes or less, which was finely pulverized by a hydrogen gas and used as a hydrogen absorption alloy powder, 0.5% by weight of conductive furnace black, and 4% by weight of polytetrafluoroethylene. The mixing was effected using a cutter mill which exerted a strong shearing force. As a result of the mixing under a strong shearing force, the fluorine resin was turned into a cotton-like mass formed of fine monofilaments, which were entangled with each other. Also, the cotton-like mixture thus prepared was found to consist of the cotton-like structure of the fluorine resin monofilaments and the particles of the hydrogen absorption alloy powder held within the spaces of the fluorine resin monofilaments, as shown in FIG. 1. The cotton-like mixture thus prepared was sprinkled onto a mesh-like current collector formed of nickel and, then, the current collector having the cotton-like mixture sprinkled thereon was passed through a pair of pressing rollers so as to manufacture a desired electrode. The fluorine resin was found to cover 47% of the surface area of the electrode.

Then, a model cell of Unit Three size as shown in FIG. 6, was manufactured using the hydrogen absorption alloy electrode noted above as the negative electrode. More specifically, the negative electrode 61 noted above, the positive electrode 62 formed of nickel oxide, and a separator 63 formed of a polyamide nonwoven fabric and interposed between the negative electrode 61 and the positive electrode 62 were tightly wound spirally in a cylindrical form so as to prepare an electrode assembly. The electrode assembly thus prepared was placed in a cylindrical container 64, followed by pouring an electrolyte, i.e., 8N—KOH aqueous solution, into the container 64. Finally, a lid 67 having a pressure sensor 66 mounted thereto was fixed to the container 64 with packings 68 interposed therebetween so as to assemble a desired model cell.

Figure 7:
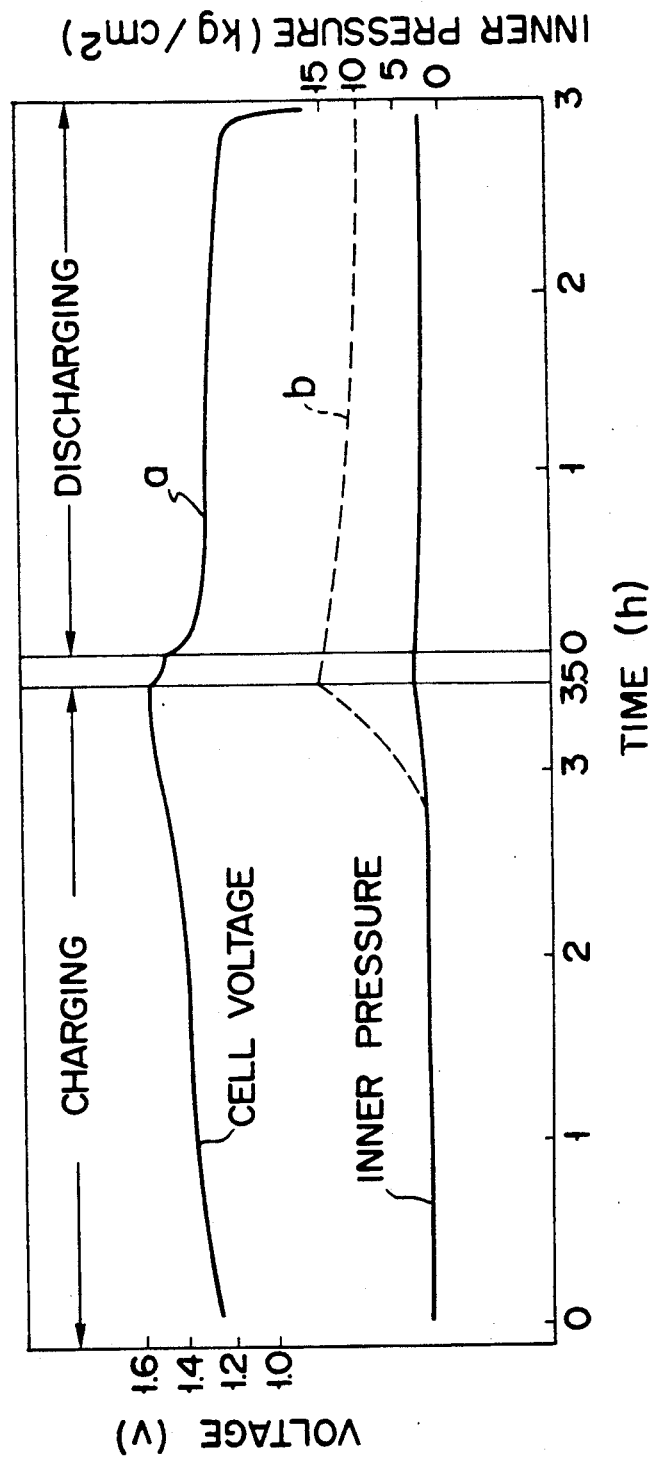
FIG. 7 is a graph showing changes with time in the inner pressure and the cell voltage during the charging time and the discharging time of a hydrogen cell in which is incorporated a hydrogen absorption alloy electrode of the present invention.

The cell thus prepared was charged with a current of $\frac{1}{3}$ C for 3.5 hours and, then, discharged with a current of $\frac{1}{3}$ C until the cell voltage was lowered to 0.9 V so as to measure the changes with time in the internal pressure and the cell voltage during the charging and discharging operations. A solid line a in FIG. 7 shows the results.

For comparison, another model cell of the similar construction was prepared as above, except that CMC thickening agent was added to the mixture of the hydrogen absorption alloy powder and the binder, and that a wet method in which water was added in the mixing step was employed in place of the dry method. The cell thus prepared was charged and, then, discharged as above, so as to measure the changes with time in the internal pressure and the cell voltage during the charging and discharging operations. A broken line b given in FIG. 7 shows the results.

To reiterate, the powdery raw materials are mixed in the present invention by, for example, a cutter mill without adding water such that a sufficient shearing force is applied to the mixture in the mixing step, followed by shaping the mixture into an electrode. As apparent from FIG. 7, the use of the particular electrode as a negative electrode makes it possible to suppress the elevation of the internal pressure and to prolong the life of the cell.

As described above in detail, the powdery raw materials are mixed while applying a shearing force in the electrode manufacturing method of the present invention. The particular mixing process permits the fluorine resin used as a binder to be turned into fine monofilaments, with the result that the hydrogen absorption alloy powder particles are strongly held by the fluorine resin binder. It follows that the hydrogen absorption alloy powder particles are prevented from dropping from the fluorine resin binder. What should also be noted is that the surface of the electrode is covered only partly with the fluorine resin, which repels water, making it possible to provide an electrode of a large capacity.

It should also be noted that, in the method of the present invention for manufacturing a hydrogen absorption alloy electrode, water is not added in the step of mixing a powdery hydrogen absorption alloy with a predetermined amount of a powdery fluorine resin binder, i.e., dry method is employed in the mixing step. Since water is not added, oxidation of the hydrogen absorption alloy as occurring in a wet method can be eliminated, leading to the manufacture of an electrode capable of rapidly reducing an oxygen gas. In addition, it is possible to eliminate the step of drying the electrode, leading to reduction in the manufacturing cost of the electrode.

Further, in the manufacturing method of the present invention, a mixture consisting of a powdery hydrogen absorption alloy and a binder in the form of entangled monofilaments is placed on a current collector, making it possible to manufacture an electrode of a predetermined thickness by a roll press operation. Further, the hydrogen absorption alloy electrode of the present invention exhibits a high capability of reducing an oxygen gas, leading to a large electrode capacity.

What is claimed is:

1. A dry method for the manufacture of a hydrogen absorption alloy electrode, comprising:
   a) mixing a fluorine resin powder in an amount of 0.5 to 5.0%, based on the weight of the electrode, with a hydrogen absorption alloy powder while applying a sufficient shearing force such that the fluorine resin powder is turned into a cotton-like entangled aggregate mixture of monofilaments each having a diameter D of about 5 to 100 microns, a length L of about 100 to 500 microns, and an aspect ratio L/D of 10 to 100, the particles of said hydrogen absorption alloy powder being held within an aggregate of fluorine resin monofilaments;
   b) placing said cotton-like mixture on a conductive substrate acting as a current collector; and
   c) forming said cotton-like mixture placed on the substrate into a shape of a desired thickness by roll pressing.

2. The method according to claim 1, wherein the fluorine resin is selected from the group consisting of polytetrafluoroethylene, tetrafluoroethylenehexafluoropropylene copolymer, ethylenetetrafluoroethylene copolymer, polytrifluoroethylene, and a mixture thereof.

3. The method according to claim 1, wherein the hydrogen absorption alloy powder and the fluorine resin powder are mixed in a mill which exerts said shearing force.

4. The method according to claim 1, wherein the hydrogen absorption alloy powder has a particle diameter of 100 $\mu$m or less.

5. The method according to claim 1, wherein the hydrogen absorption alloy powder is selected from the group consisting of $LaNi_5$, $MmNi_5$, $LmNi_5$, alloys of $MmNi_5$ and $LmNi_5$ each having Ni partly replaced by other metal elements, $Mg_2Ni$, TiNi and TiFe, and wherein Mm represents a Misch metal and Lm represents a Misch metal rich in lanthanum.

6. A hydrogen absorption alloy electrode roll-pressed from a cotton-like entangled aggregate mixture of monofilaments of fluorine resin and a hydrogen absorption alloy, the particles of said hydrogen absorption alloy powder being held within an aggregate of fluorine resin monofilaments, each of the monofilaments having a diameter D of about 5 to 100 microns, a length L of about 100 to 500 microns, and an aspect ratio L/D of 10 to 100, said fluorine resin being contained in an amount of 0.5 to 5.0% based on the weight of the electrode, and said fluorine resin covering 5 to 60% of the electrode surface.

7. The electrode according to claim 6, wherein said electrode is in the form of a sheet laminated on a conductive substrate acting as a current collector.

8. The electrode according to claim 6, wherein the fluorine resin is selected the group consisting of polytetrafluoroethylene, tetrafluoroethylenehexafluoropropylene copolymer, ethylenetetrafluoroethylene copolymer, polytrifluoroethylene, and a mixture thereof.

9. The electrode according to claim 6, wherein the hydrogen absorption alloy powder has a particle diameter of 100 microns or less.

10. The electrode according to claim 6, wherein the hydrogen absorption alloy powder is selected from the group consisting of $LaNi_5$, $MmNi_5$, $LmNi_5$, alloys of $MmNi_5$ and $LmNi_5$ each having Ni partly replaced by other metal elements, $Mg_2Ni$, TiNi and TiFe, and wherein Mm represents a Misch metal and Lm represents a Misch metal rich in lanthanum.

11. A mixture for forming a hydrogen absorption alloy electrode, comprising a cotton-like entangled aggregate mixture of monofilaments of fluorine resin and a hydrogen absorption alloy powder, the particles of said hydrogen absorption alloy powder being held within an aggregate of fluorine resin monofilaments, each of the monofilaments having a diameter D of about of about 5 to 100 microns, a length L of about 100 to 500 microns, and an aspect ratio L/D of 10 to 100, and said fluorine resin being contained in an amount of 0.5 to 5.0% based on the weight of each electrode.

12. The mixture according to claim 11, wherein the fluorine resin is selected from the group consisting of polytetrafluoroethylene, tetrafluoroethylenehexafluoropropylene copolymer, ethylenetetrafluoroethylene copolymer, polytrifluoroethylene, and a mixture thereof.

13. The mixture according to claim 11, wherein the hydrogen absorption alloy powder has a particle diameter of 100 $\mu$m or less.

14. The mixture according to claim 11, wherein the hydrogen absorption alloy powder is selected from the group consisting of $LaNi_5$, $MmNi_5$, $LmNi_5$, alloys of $MmNi_5$ and $LmNi_5$ each having Ni partly replaced by other metal elements, $Mg_2Ni$, TiNi and TiFe, wherein Mm is a Misch metal and Lm is a Misch metal rich in lanthanum.

* * * * *